United States Patent
Sakata et al.

(10) Patent No.: US 11,011,769 B2
(45) Date of Patent: May 18, 2021

(54) FUEL CELL CATALYST LAYER, MEMBRANE ELECTRODE ASSEMBLY, AND FUEL CELL

(71) Applicant: PANASONIC INTELLECTUAL PROPERTY MANAGEMENT CO., LTD., Osaka (JP)

(72) Inventors: Motohiro Sakata, Osaka Fu (JP); Takeshi Minamiura, Osaka Fu (JP); Shinichiro Imura, Hyogo Ken (JP); Hitoshi Ishimoto, Hyogo Ken (JP); Kazuya Yamasaki, Osaka Fu (JP); Chiho Nobumori, Hyogo Ken (JP); Yukihiro Shimasaki, Hyogo Ken (JP); Tsutomu Fujii, Osaka Fu (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 51 days.

(21) Appl. No.: 16/331,666

(22) PCT Filed: Sep. 5, 2017

(86) PCT No.: PCT/JP2017/031983
§ 371 (c)(1),
(2) Date: Mar. 8, 2019

(87) PCT Pub. No.: WO2018/047830
PCT Pub. Date: Mar. 15, 2018

(65) Prior Publication Data
US 2019/0198906 A1    Jun. 27, 2019

(30) Foreign Application Priority Data

Sep. 9, 2016  (JP) .............................. JP2016-177043
Sep. 20, 2016  (JP) .............................. JP2016-183340

(51) Int. Cl.
    *H01M 8/24*    (2016.01)
    *H01M 8/22*    (2006.01)
    (Continued)

(52) U.S. Cl.
    CPC .......... *H01M 8/225* (2013.01); *H01M 4/663* (2013.01); *H01M 4/667* (2013.01);
    (Continued)

(58) Field of Classification Search
    CPC .. H01M 8/225; H01M 8/0234; H01M 8/0239; H01M 8/0245; H01M 8/24;
    (Continued)

(56) References Cited

U.S. PATENT DOCUMENTS

2005/0181270 A1    8/2005  Sugiura

FOREIGN PATENT DOCUMENTS

| JP | H02-027661 A | 1/1990 |
| JP | 2005-032681 A | 2/2005 |

(Continued)

OTHER PUBLICATIONS

International Search Report and Written Opinion issued in International Patent Application No. PCT/JP2017/031983; dated Nov. 21, 2017; with partial English translation.

*Primary Examiner* — Raymond Alejandro
(74) *Attorney, Agent, or Firm* — McDermott Will and Emery LLP

(57) ABSTRACT

Provided is a fuel cell catalyst layer including: a fibrous carbon material; catalyst particles; a particulate carbon material; and a proton-conductive resin, wherein a region A including at least the fibrous carbon material in a state of an agglomerated body and a region B including at least the catalyst particles, the particulate carbon material, and the
(Continued)

proton-conductive resin are formed, the region A being disposed in an island form in the region B.

6 Claims, 7 Drawing Sheets

(51) Int. Cl.
    *H01M 8/1004*     (2016.01)
    *H01M 4/86*     (2006.01)
    *H01M 4/66*     (2006.01)
    *H01M 8/0234*     (2016.01)
    *H01M 8/0239*     (2016.01)
    *H01M 8/0245*     (2016.01)
    *H01M 8/1018*     (2016.01)

(52) U.S. Cl.
    CPC ....... *H01M 4/8668* (2013.01); *H01M 4/8673* (2013.01); *H01M 8/0234* (2013.01); *H01M 8/0239* (2013.01); *H01M 8/0245* (2013.01); *H01M 8/1004* (2013.01); *H01M 8/24* (2013.01); *H01M 2008/1095* (2013.01)

(58) Field of Classification Search
    CPC .... H01M 8/1004; H01M 4/663; H01M 4/667; H01M 4/8668; H01M 4/8673; H01M 2008/1095
    See application file for complete search history.

(56) References Cited

FOREIGN PATENT DOCUMENTS

| | | | | |
|---|---|---|---|---|
| JP | 2005-228601 A | 8/2005 | | |
| JP | 2007-012325 A | 1/2007 | | |
| JP | 2008-210580 A | 9/2008 | | |
| JP | 2010-135307 A | 6/2010 | | |
| JP | 2011-233483 | * 11/2011 | ............. | H01M 4/86 |
| JP | 2011-233483 A | 11/2011 | | |

* cited by examiner

FUEL CELL CATALYST LAYER, MEMBRANE ELECTRODE ASSEMBLY, AND FUEL CELL

CROSS-REFERENCE OF RELATED APPLICATIONS

This application is the U.S. National Phase under 35 U.S.C. § 371 of International Patent Application No. PCT/JP2017/031983, filed on Sep. 5, 2017, which in turn claims the benefit of Japanese Application 2016-177043, filed on Sep. 9, 2016 and Japanese Application 2016-183340, filed on Sep. 20, 2016, the entire disclosures of which Applications are incorporated by reference herein.

TECHNICAL FIELD

The present invention relates to a fuel cell catalyst layer, a membrane electrode assembly, and a fuel cell using the same, and more preferably relates to an improvement in a catalyst layer including a fibrous carbon material.

BACKGROUND ART

Fuel cells are highly efficient and clean power generation apparatuses that generate power through electrochemical reaction between a fuel and an oxidant (hereinafter each simply referred to as a "gas") and produce water. A fuel cell includes, for example, an electrolyte membrane, two catalyst layers disposed so as to sandwich the electrolyte membrane, two gas diffusion layers disposed so as to sandwich the electrolyte membrane via the catalyst layers respectively, and two separators disposed so as to sandwich the electrolyte membrane via the gas diffusion layers respectively. The gases that have been diffused in the plane direction by the gas diffusion layers are oxidized or reduced in the catalyst layers. The efficiency of this electrochemical reaction increases when the gas diffusion in the catalyst layers is enhanced.

In order to enhance the gas diffusion in the catalyst layers, PTL 1 teaches a method in which carbon fiber is mixed in the catalyst layers, thus increasing the porosity. PTL 2 also teaches mixing carbon fiber in an anode catalyst layer.

CITATION LIST

Patent Literatures

[PTL 1] Japanese Laid-Open Patent Publication No. H2-27661
[PTL 2] Japanese Laid-Open Patent Publication No. 2008-210580

SUMMARY OF INVENTION

Technical Problem

Increasing the overall porosity of the catalyst layers improves the gas diffusion in the catalyst layers. On the other hand, the strength of the catalyst layers is reduced. If the catalyst layers have the same mass per unit area, increasing the porosity results in an increased thickness. Therefore, the travel distance of electrons or protons is increased, resulting in an increased resistance.

Solution to Problem

An aspect of the present invention relates to a fuel cell catalyst layer including: a fibrous carbon material; catalyst particles; a particulate carbon material; and a proton-conductive resin, wherein a region A including at least the fibrous carbon material in a state of an agglomerated body and a region B including at least the catalyst particles, the particulate carbon material, and the proton-conductive resin are formed, the region A being disposed in an island form in the region B.

Another aspect of the present invention relates to a fuel cell including: an electrolyte membrane; a first catalyst layer and a second catalyst layer that are disposed so as to sandwich the electrolyte membrane; a first gas diffusion layer and a second gas diffusion layer that are disposed so as to sandwich the electrolyte membrane via the first catalyst layer and the second catalyst layer respectively; and a first separator and a second separator that are disposed so as to sandwich the electrolyte membrane via the first gas diffusion layer and the second gas diffusion layer respectively, wherein at least one of the first catalyst layer and the second catalyst layer is the above-described fuel cell catalyst layer.

Yet another aspect the present invention relates to a membrane electrode assembly including: a catalyst layer including a first principal surface and a second principal surface; a gas diffusion layer disposed on the first principal surface; and an electrolyte membrane disposed on the second principal surface, wherein the catalyst layer includes a fibrous carbon material, catalyst particles, a particulate carbon material, and a proton-conductive resin, the fibrous carbon material includes a first fibrous carbon material oriented along the first principal surface, and a second fibrous carbon material oriented along a thickness direction of the catalyst layer, and, where T represents the thickness of the catalyst layer, a ratio $R1:FF_1/SF_1$ of the number $FF_1$ of pieces of the first fibrous carbon material to the number $SF_1$ of pieces of the second fibrous carbon material in a first region extending from the first principal surface of the catalyst layer to 0.25 T, a ratio $R2:FF_2/SF_2$ of the number $FF_2$ of pieces of the first fibrous carbon material to the number $SF_2$ of pieces of the second fibrous carbon material in a second region extending from the second principal surface of the catalyst layer to 0.25 T, and a ratio $R3:FF_3/SF_3$ of the number $FF_3$ of pieces of the first fibrous carbon material to the number $SF_3$ of pieces of the second fibrous carbon material in a third region of the catalyst layer other than the first region and the second region satisfy at least one of the relationships: R3<R1 and R3<R2.

Still another aspect of the present invention relates to a fuel cell including: an electrolyte membrane; a first catalyst layer and a second catalyst layer that are disposed so as to sandwich the electrolyte membrane; a first gas diffusion layer and a second gas diffusion layer that are disposed so as to sandwich the electrolyte membrane via the first catalyst layer and the second catalyst layer respectively; and a first separator and a second separator that are disposed so as to sandwich the electrolyte membrane via the first gas diffusion layer and the second gas diffusion layer respectively, wherein the first catalyst layer includes a fibrous carbon material, catalyst particles, a particulate carbon material, and a proton-conductive resin, the fibrous carbon material includes a first fibrous carbon material oriented along a first principal surface of the first catalyst layer that opposes the first gas diffusion layer, and a second fibrous carbon material oriented along a thickness direction of the first catalyst layer, and, where T represents the thickness of the first catalyst layer, a ratio $R1: FF_1/SF_1$ of the number $FF_1$ of pieces of the first fibrous carbon material to the number $SF_1$ of pieces of the second fibrous carbon material in a first region extending from the first principal surface of the first catalyst layer to 0.25 T, a ratio R2: $FF_2/SF_2$ of the number $FF_2$ of pieces of the first fibrous carbon material to the number $SF_2$ of pieces of the second fibrous carbon material in a second region extending from the second principal surface of the first catalyst layer to 0.25 T, and a ratio R3: $FF_3/SF_3$ of the number $FF_3$ of pieces of the first fibrous carbon material to the number $SF_3$ of pieces of the second fibrous carbon material in a third region of the first catalyst layer other than the first region and the second region satisfy at least one of the relationships: R3<R1 and R3<R2.

Advantageous Effects of Invention

With the fuel cell catalyst layer according to the present invention, it is possible to improve the gas diffusion, while suppressing an increase in the resistance.

Furthermore, with the membrane electrode assembly according to the present invention, it is possible to suppress an increase in the resistance, while improving the gas diffusion.

DESCRIPTION OF EMBODIMENTS

Figure 1:
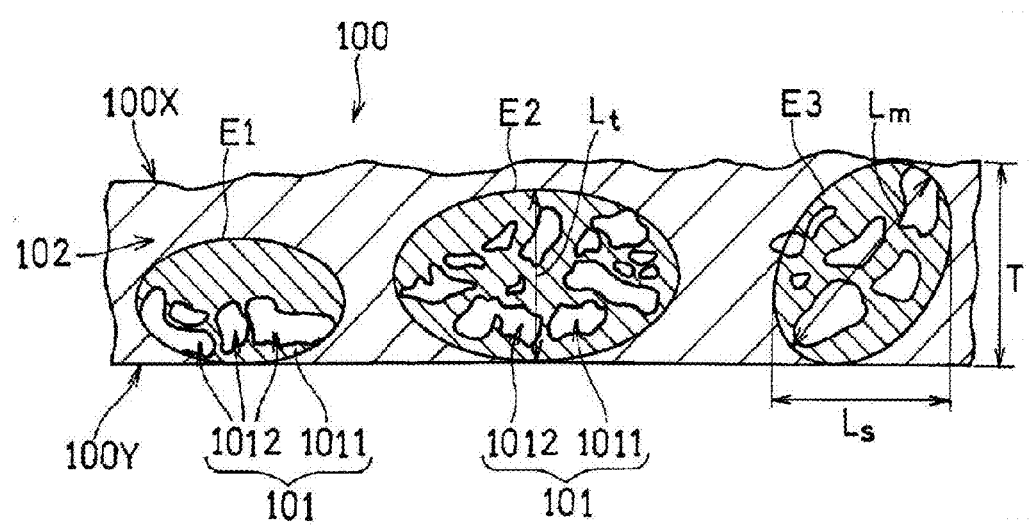
FIG. 1 is a cross-sectional view schematically showing the structure of a fuel cell catalyst layer according to a first mode of the present invention.

A catalyst layer or a membrane electrode assembly that has a low resistance and high gas diffusion can be implemented according to the following two modes.

A. First Mode

The first mode is a fuel cell catalyst layer including a fibrous carbon material, catalyst particles, a particulate carbon material, and a proton-conductive resin.

In the fuel cell catalyst layer, a region A including at least the fibrous carbon material in a state of an agglomerated body and a region B including at least the catalyst particles, the particulate carbon material, and the proton-conductive resin are formed, the region A being disposed in an island form in the region B. The first mode further includes a fuel cell including the above-described fuel cell catalyst layer.

B. Second Mode

The second mode is a membrane electrode assembly including: a catalyst layer including a first principal surface and a second principal surface; a gas diffusion layer disposed on the first principal surface; and an electrolyte membrane disposed on the second principal surface.

The catalyst layer includes a fibrous carbon material, catalyst particles, a particulate carbon material, and a proton-conductive resin, the fibrous carbon material includes a first fibrous carbon material oriented along the first principal surface, and a second fibrous carbon material oriented along a thickness direction of the catalyst layer. Where T represents the thickness of the catalyst layer, a ratio $R1:FF_1/SF_1$ of the number $FF_1$ of pieces of the first fibrous carbon material to the number $SF_1$ of pieces of the second fibrous carbon material in a first region extending from the first principal surface of the catalyst layer to 0.25 T, a ratio $R2:FF_2/SF_2$ of the number $FF_2$ of pieces of the first fibrous carbon material to the number $SF_2$ of pieces of the second fibrous carbon material in a second region extending from the second principal surface of the catalyst layer to 0.25 T, and a ratio $R3:FF_3/SF_3$ of the number $FF_3$ of pieces of the first fibrous carbon material to the number $SF_3$ of pieces of the second fibrous carbon material in a third region of the catalyst layer other than the first region and the second region satisfy at least one of the relationships: R3<R1 and R3<R2. The second mode further includes a fuel cell including the above-described membrane electrode assembly.

Each of the modes will be described in detail.

A. First Mode (1) Fuel Cell Catalyst Layer

A fuel cell catalyst layer (hereinafter simply referred to as a "catalyst layer") according to an embodiment includes a fibrous carbon material, catalyst particles, a particulate carbon material, and a proton-conductive resin. In the catalyst layer, at least a part of the fibrous carbon material agglomerates to form an agglomerated body. A region including the agglomerated body is referred to as a region A. The region A is disposed in an island form in a region B including the catalyst particles, the particulate carbon material, and the proton-conductive resin.

Hereinafter, a catalyst layer according to the present embodiment will be described with reference to FIG. 1. FIG. 1 is a cross-sectional view schematically showing the structure of a catalyst layer 100. The catalyst layer 100 has a first principal surface 100X, and a second principal surface 100Y located opposite to the first principal surface 100X, and includes a region B 102 and regions A 101 disposed in an island form in the region B 102. Being disposed in an island form means that a region A 101 that is sufficiently smaller than the region B 102 is disposed in the region B 102.

[Region A]

Each region A 101 is formed by aggregation of a plurality of pieces of fibrous carbon material (not shown). The aggregation of the fibrous carbon materials is caused, for example, by a van der Waals force or electrostatic repulsion. The plurality of pieces of fibrous carbon materials agglomerate so as to be entangled with each other. Consequently, voids 1012 are formed inside the agglomerated body. Accordingly, the porosity of the region A 101 is higher than that of the region B 102. The voids 1012 formed in the region A 101 increase the diffusion of the gas (a fuel or an oxidant) in the catalyst layer 100. The region A 101 is disposed in an island form (or partially) in the region B 102.

Accordingly, the voids 1012 that allows the gas to be diffused in the catalyst layer 100 can be formed without increasing the thickness of the catalyst layer 100, and also without reducing the strength of the catalyst layer 100. This suppresses an increase in the travel distance of protons. Furthermore, the conductive fibrous carbon materials are disposed around the voids 1012, so that an increase in the travel distance of electrons is suppressed. Accordingly, it is possible to enhance the gas diffusion, while suppressing an increase in the resistance. Note that portions of the regions A 101 that are other than the voids 1012 and include a skeleton formed by the fibrous carbon material are indicated as structure portions 1011 in FIG. 1.

Each region A 101 can be determined in the following manners.

First, an image of a cross section of the catalyst layer 100 along the thickness direction is captured with a SEM, and the resultant image is binarized. At this time, a threshold is determined such that each structure portion 1011 has a bright luminance, and each void 1012 has a dark luminance. In this manner, a processed image is obtained in which the structure portions 1011 are represented by white pixels, and the voids 1012 are represented by black pixels. Note that the white-and-black color arrangement may be reversed.

Next, an ellipse (including a circle) E is assumed in which the ratio between the minor diameter and the major diameter (major diameter/minor diameter) is 1 or more and 3 or less, and the length of the minor diameter or the major diameter is less than or equal to the thickness T of the catalyst layer 100. An ellipse E that can be assumed by the conditions is regarded as the outer edge of a region A 101 including an agglomerated body. In FIG. 1, three ellipses E1, E2, and E3 are assumed.

In the processed image obtained in the above-described manner, a region where the pixels of black (voids) aggregate to form islands is present. With this region as a target, the ellipse E is placed on the processed image such that the number of black pixels constitute 40%, while adjusting the size and the ratio between the minor diameter and the major diameter, and also the angle of the major axis of the ellipse E to the first principal surface 100X. At this time, the ellipse E may be disposed so as to connect the first principal surface 100X and the second principal surface 100Y. The region enclosed by the ellipse E is the region A 101. A plurality of voids 1012 may be included inside the ellipse E.

The ellipse E is set so as to satisfy the above-described conditions and to increase the major diameter as much as possible. On the other hand, when the interval between adjacent voids 1012 exceeds 2 μm the size of the ellipse E is set by regarding the two voids 1012 as belonging to different regions A 101, or regarding one of the two voids 1012 as not belonging to the region A 101. Note that, as shown in the ellipse E3, it is not necessary to completely fit the entirety of one void 1012 inside the ellipse E.

The shape of the voids 1012 is not particularly limited. The size of the voids 1012 belonging to each region A 101 is not also particularly limited. From the viewpoint of the gas diffusion, the region A 101 may include at least one void 1012 having a maximum diameter of 0.04 μm or more. On the other hand, from the viewpoint of securing the strength of the catalyst layer 100, the maximum diameter of the void 1012 may be 50 μm or less.

The maximum diameter of the void 1012 may be calculated from a void 1012 determined using the above-described processed image. Specifically, straight lines passing through the center of the void 1012 (or the center of gravity determined from the shape of the void) are drawn radially. Of the distances between two points where the straight lines intersect the outer edge of the void 1012, the longest distance is determined as the maximum diameter of the void 1012.

From the viewpoint of the gas diffusion and the securing of the strength, the major diameter Lm (i.e., the major diameter of the ellipse E) of the region A 101 may be 1 to 50 μm, and may be 1 to 15 μm. The major diameter Lm of the region A 101 is the average value of the major diameters of 5 to 10 regions A 101, for example. The same also applies to the length Ls of the region A in the principal surface direction of the catalyst layer, and the length Lt of the region A in a direction perpendicular to the principal surface direction.

The length Ls of the region A 101 in the direction of the first principal surface 100X and the length Lt of the region A 101 in a direction perpendicular to the direction of the first principal surface 100X may satisfy the relationship: Ls<Lt. In this case, the gas diffusion in the thickness direction of the catalyst layer 100 is particularly easily improved. By satisfying the relationship: Ls<Lt, water that has been generated through a reaction between a fuel and an oxidant is promptly discharged to the gas diffusion layer side. At least one region A 101 that satisfies the relationship: Ls<Lt may be formed in the catalyst layer 100.

If the relationship: Ls<Lt is satisfied, the ratio (Lt/Ls) of the length Lt to the length Ls is not particularly limited, and may be such that Lt/Ls=1.1 to 5, for example. This makes it further easier to enhance the gas diffusion in the thickness direction of the catalyst layer 100, and also to discharge the water.

The length Ls is not particularly limited, and may be, for example, 1 to 5 μm, and may be 1 to 3 μm. The length Lt is not also particularly limited, and may be, for example, 1.1 to 10 μm, and may be 1.1 to 6 μm.

In FIG. 1, the major diameter (Lm) and the length Ls of the ellipse E1 are equal (Lm=Ls), and greater than the length Lt (Lt<Lm, Ls). The length Lt is smaller than the thickness T of the region A 101 (Lt<T). Similarly, the major diameter (Lm) and the length Ls of the ellipse E2 are equal (Lm=Ls), and greater than the length Lt (Lt<Lm, Ls). The length Lt is smaller than the thickness T of the region A 101 (Lt<T). However, the major diameter of the ellipse E2 is greater than the major diameter of the ellipse E1. On the other hand, the major diameter (Lm) of the ellipse E3 is greater than the length Ls (Lm>Ls), and greater than the length Lt (Lm>Lt). The length Lt is equal to the thickness T of the region A 101 (Lt=T).

The ratio: Va/V of the volume Va of the region A 101 to the volume V of the catalyst layer 100 is not particularly limited. From the viewpoint of the discharging of water, the gas diffusion, and the securing of the strength, Va/V may be 0.5 to 80%, may be 1 to 60%, may be 5 to 60%, and may be 25 to 50%. Va/V can be calculated as an average value when cross sections with a width of 100 μm at ten locations of the catalyst layer 100 are observed. The Va/V on each of the cross sections can be calculated by dividing the area of the ellipse E placed on the above-described processed image (when a plurality of ellipses E are present, the total area thereof) by the area of the catalyst layer 100 in the processed image, and multiplying the resultant by 100. The cross sections at the ten locations are, for example, the cross section of a given portion of the catalyst layer 100, and cross sections at nine locations obtained by cutting the catalyst layer 100 parallel to the earlier mentioned cross section and at equal intervals.

Each region A 101 is disposed in an island form in the region B 102. From the viewpoint of the in-plane uniformity of the catalyst layer 100, the plurality of regions A 101 may be disposed discretely in the region B 102. In other words, the regions A 101 may be scattered in the region B 102. For example, when the catalyst layer 100 is viewed from the normal direction of the first principal surface 100X, two or more regions A 101, per region of 100 μm×100 μm, may be disposed spaced apart from each other at an interval of 2 μm or more. Alternatively, when a cross section with a width of 100 of μm of the catalyst layer 100 is observed in the above-described processed image, two or more regions A 101 may be disposed at an interval of 2 μm or more. Note that the catalyst layer 100 may include, per region of 100 μm×100 μm, two or more regions A 101 having a distance of 2 μm or more from the adjacent region A 101, and also may include a region A 101 having a distance of less than 2 μm from the adjacent region A 101.

The region A 101 may be disposed so as to connect the first principal surface 100X and the second principal surface 100Y. That is, the catalyst layer 100 may include a region A in which the above-described length Lt is equal to the thickness T of the region A 101 (e.g., the ellipse E3 shown in FIG. 1). In this case, the gas diffusion in the thickness direction of the catalyst layer 100 can be more easily improved, and the discharging of water is further facilitated.

The region A 101 may include at least the structure portion 1011 including an agglomerated body, and the void 1012. A part of the structure portion 1011 may not need to include an agglomerated body. That is, the structure portion 1011 may include, in addition to a part constituted by the agglomerated body, a part that includes the agglomerated body and at least one of the catalyst particles, the particulate carbon material, and the proton-conductive resin (all not shown), which are the constituents of the region B 102, or a part that does not include the agglomerated body and includes at least one of the catalyst particles, the particulate carbon material, and the proton-conductive resin.

(Fibrous Carbon Material)

Examples of the fibrous carbon material include vapor grown carbon fiber (VGCF), carbon nanotube, and carbon nanofiber. The length of the fibrous carbon material is not particularly limited. In particular, since the agglomerated body can be easily formed, the average fiber length of the fibrous carbon material may be 0.2 to 20 μm, and may be 0.2 to 10 μm. The diameter of the fibrous carbon material is not particularly limited. Since the agglomerated body can be easily formed and the path for a gas can be easily secured, the average diameter of the fibrous carbon material may be 5 to 200 nm, and may be 10 to 150 nm.

[Region B]

The region B 102 includes the catalyst particles, the particulate carbon material, and the proton-conductive resin.

(Catalyst Particles)

The catalyst particles are not particularly limited, and examples thereof include catalyst metals such as alloys and simple substances selected from Sc, Y, Ti, Zr, V, Nb, Fe, Co, Ni, Ru, Rh, Pd, Pt, Os, Ir, lanthanoid series elements, and actinoid series elements. Examples of the catalyst particles used for the anode include Pt—Ru alloys. Examples of the catalyst metal used for the cathode include Pt and Pt—Co alloys. At least a part of the catalyst particles is supported on the particulate carbon material. The catalyst particles may also be supported on the fibrous carbon material, as well as on the particulate carbon material. The catalyst particles may also be supported on the fibrous carbon material located in the region A 101. Since a gas easily flows in the region A 101, the catalyst particles can easily come into contact with the gas, thus increasing the efficiency of the oxidation reaction or the reduction reaction of the gas.

(Particulate Carbon Material)

Although the particulate carbon material is not particularly limited, carbon black is preferred because of the excellent conductivity. Examples of the carbon black include acetylene black, ketjen black, thermal black, furnace black, and channel black. The particle size of the carbon black (or the length of a structure composed of a plurality of connected primary particles) is not particularly limited, and it is possible to use any carbon black that has been conventionally used for the catalyst layers of fuel cells.

(Proton-Conductive Resin)

The proton-conductive resin is not particularly limited, and examples thereof include perfluorocarbon sulfonic acid-based polymers and hydrocarbon-based polymers. Among them, perfluorocarbon sulfonic acid-based polymers are preferred because of the excellent heat resistance and chemical stability. Examples of the perfluorocarbon sulfonic acid-based polymers include Nafion®.

In the catalyst layer 100, the fibrous carbon material may be included in an amount of 3 to 15 parts by mass, and may be included in an amount of 5 to 10 parts by mass, per 100 parts by mass of the total amount of the catalyst particles, the particulate carbon material, and the proton-conductive resin. The reason is that the agglomerated body can be readily formed. From the same viewpoint, the ratio of the fibrous carbon material in the carbon materials as a whole, including the particulate carbon material and the fibrous carbon material, may be 10 to 50 mass %, and may be 15 to 30 mass %.

The thickness T of the catalyst layer 100 is preferably small in consideration of the size reduction of the fuel cell, but is preferably not too small in view of the strength. The thickness T of the catalyst layer 100 is 10 to 60 μm for example. The thickness T of the catalyst layer 100 is an average value of the distances from one principal surface to the other principal surface at ten arbitrary locations. For example, the thickness T of the catalyst layer 100 can be calculated by averaging the shortest distances from one principal surface to the other principal surface for ten arbitrary locations on a cross section with a width of 100 μm of the catalyst layer 100 in the above-described processed image.

The catalyst layer 100 is produced, for example, in the following manner. First, the catalyst particles and the particulate carbon material are mixed in a dispersion medium (e.g., water, ethanol, propanol, or the like). Then, the proton-conductive resin and the fibrous carbon material are successively added to the resultant dispersion under stirring, to give a catalyst dispersion. The proton-conductive resin may be added in two portions. In this case, addition of the second portion of the proton-conductive resin may be carried out together with addition of the fibrous carbon material. Although the stirring conditions are not particularly limited, the stirring may be performed so as to intentionally cause agglomeration of the fibrous carbon material, by adjusting the number of rotations and the time.

Finally, the obtained catalyst dispersion is applied in a uniform thickness to the surface of a suitable transfer base material sheet, and dried, to give a catalyst layer 100. Examples of the application method include conventional application methods, including, for example, spraying and screen printing, and coating methods using various coaters such as a blade coater, a knife coater, and a gravure coater. As the transfer base material sheet, it is preferable to use, for example, a sheet having a smooth surface, such as a polyethylene terephthalate (PET) sheet and a polypropylene sheet. The obtained catalyst layer 100 is transferred to an electrolyte membrane, which will be described below. In transferring, the surface of the catalyst layer 100 that has opposed the transfer base material sheet is abutted against the electrolyte membrane. Abutting the smooth surface of the catalyst layer 100 against the electrolyte membrane inhibits the localization of the current flowing into the electrolyte membrane or flowing out of the electrolyte membrane when the fuel cell is operated, so that the durability of the catalyst layer is improved. The catalyst dispersion may be applied directly to the electrolyte membrane.

(2) Fuel Cell

A fuel cell according to an embodiment includes an electrolyte membrane, a first catalyst layer and a second catalyst layer that are disposed so as to sandwich the electrolyte membrane, a first gas diffusion layer and a second gas diffusion layer that are disposed so as to sandwich the electrolyte membrane via the first catalyst layer and the second catalyst layer respectively, and a first separator and a second separator that are disposed so as to sandwich the electrolyte membrane via the first gas diffusion layer and the second gas diffusion layer respectively. The fuel cell includes the catalyst layer 100 as at least one of the first catalyst layer and the second catalyst layer.

Figure 2A:
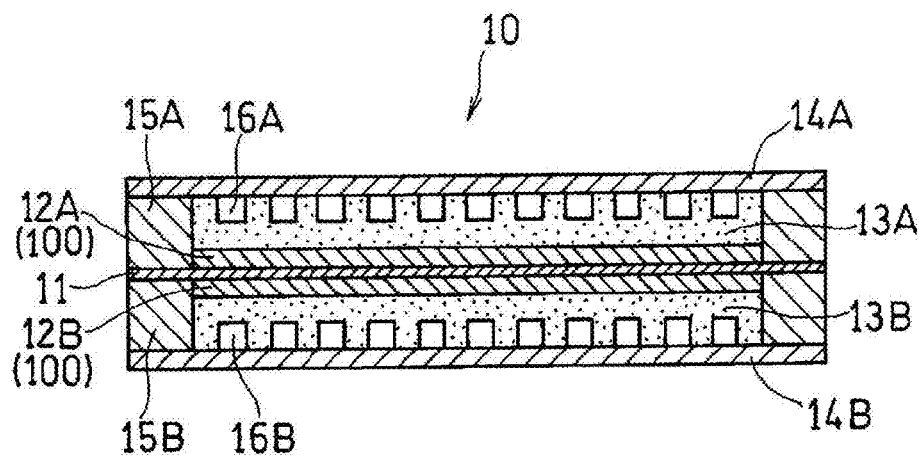
FIG. 2A is a cross-sectional view schematically showing the structure of a unit cell of a fuel cell according to the first mode of the present invention.
Figure 2B:
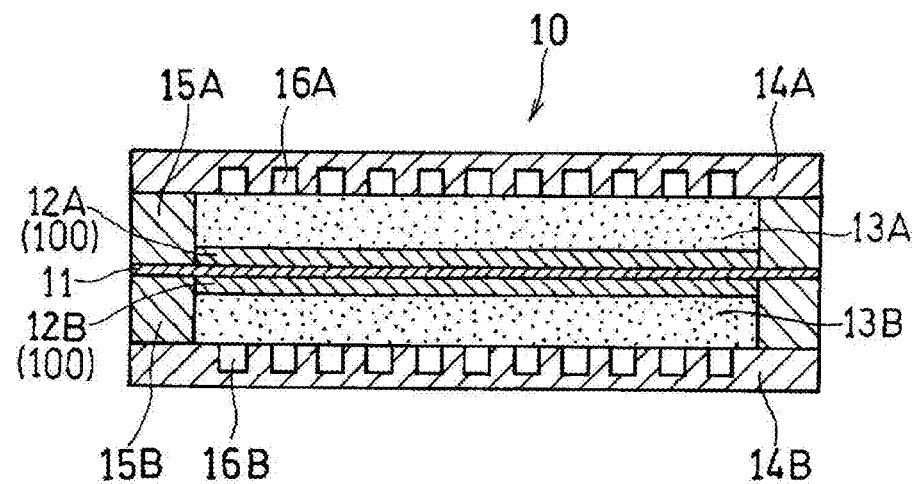
FIG. 2B is a cross-sectional view schematically showing the structure of another unit cell of the fuel cell according to the first mode of the present invention.

In the following, an example of the structure of the fuel cell according to the present embodiment will be described with reference to FIGS. 2A and 2B. FIG. 2A is a cross-sectional view schematically showing the structure of a unit cell disposed in the fuel cell according to the present embodiment. FIG. 2B is a cross-sectional view schematically showing the structure of another unit cell disposed in the fuel cell according to the present embodiment. Ordinarily, a plurality of unit cells are stacked, and disposed as a cell stack in the fuel cell. For the sake of convenience, one unit cell is shown in FIGS. 2A and 2B.

A unit cell 10 includes an electrolyte membrane 11, a first catalyst layer 12A and a second catalyst layer 12B that are disposed so as to sandwich the electrolyte membrane 11, a first gas diffusion layer 13A and a second gas diffusion layer 13B that are disposed so as to sandwich the electrolyte membrane 11 via the first catalyst layer 12A and the second catalyst layer 12B respectively, and a first separator 14A and a second separator 14B that are disposed so as to sandwich the electrolyte membrane 11 via the first gas diffusion layer 13A and the second gas diffusion layer 13B respectively. One of the first catalyst layer 12A and the second catalyst layer 12B functions as an anode, and the other functions as a cathode. The electrolyte membrane 11 is one size larger than the first catalyst layer 12A and the second catalyst layer 12B, and, therefore, the peripheral edge portion of the electrolyte membrane 11 protrudes from the first catalyst layer 12A and the second catalyst layer 12B. The peripheral edge portion of the electrolyte membrane 11 is sandwiched by the pair of seal members 15A and 15B.

(Catalyst Layer)

At least one of the first catalyst layer 12A and the second catalyst layer 12B is the above-described catalyst layer 100. When the first catalyst layer 12A or the second catalyst layer 12B is not the above-described catalyst layer 100, a known material and a known configuration can be used for the catalyst layers.

(Electrolyte Membrane)

As the electrolyte membrane 11, a polymer electrolyte membrane can be preferably used. Examples of the material of the polymer electrolyte membrane include the polymer electrolytes given as the examples of the proton-conductive resin. The thickness of the electrolyte membrane 11 is 5 to 30 μm, for example.

(Gas Diffusion Layer)

A conductive porous base material can be used as each of the first gas diffusion layer 13A and the second gas diffusion layer 13B. Preferably, the conductive porous base material is formed of a carbonaceous material such as carbon black, graphite, and carbon fiber. Specific examples thereof include carbon paper, carbon cloth, and a porous conductive carbon sheet obtained by forming a composition including a carbon material and a binder into a sheet.

As shown in FIG. 2A, a gas flow channel 16A may be formed on the surface of the first gas diffusion layer 13A that abuts against the first separator 14A. A gas flow channel 16B may be formed on the surface of the second gas diffusion layer 13B that abuts against the second separator 14B. The shape of the gas flow channels is not particularly limited, and the gas flow channels may be formed in a parallel configuration or a serpentine configuration, for example.

(Separator)

The first separator 14A and the second separator 14B may have airtightness, electron conductivity, and electrochemical stability, and the material thereof is not particularly limited. As such a material, a carbon material, a metal material, and the like are preferred. The metal material may be coated with carbon. For example, the first separator 14A and the second separator 14B can be obtained by punching a metal plate into a predetermined shape, and subjecting the metal plate to surface treatment.

As shown in FIG. 2B, a gas flow channel 16A may be formed on the surface of the first separator 14A that abuts against the first gas diffusion layer 13A. A gas flow channel 16B may be formed on the surface of the second separator 14B that abuts against the second gas diffusion layer 13B. The shape of the gas flow channels is not particularly limited, and the gas flow channels may be formed in a parallel configuration or a serpentine configuration, for example. Note that each of the gas flow channels 16A and 16B may be formed on one of the corresponding gas diffusion layer and the corresponding separator.

(Seal Member)

The seal members 15A and 15B are materials having elasticity, and prevent a fuel and/or an oxidant from leaking from the gas flow channels 16A and 16B. For example, the seal members 15A and 15B may have the shape of a frame surrounding, in a loop manner, the peripheral edge portions of the first catalyst layer 12A and the second catalyst layer 12B. A known material and a known configuration may be used for each of the seal members 15A and 15B.

In the following, the present embodiment will be described in further detail by way of examples. However, it should be noted that the present embodiment is not limited to the following examples.

Example 1

Production of Catalyst Layer

A particulate carbon material (carbon black) carrying catalyst particles (Pt—Co alloy) thereon was added to a proper amount of water, and dispersed by stirring. After a proper amount of ethanol was added to the resultant dispersion under stirring, 40 parts by mass of a proton-conductive resin (Nafion®) was added, per 100 parts by mass of the above-described particulate carbon material carrying 30 parts by mass of the catalyst particles, to prepare a dispersion A. Separately, 13.5 parts by mass of a fibrous carbon material (VGCF, average diameter: 150 nm, average fiber length: 10 µm) and 40 parts by mass of a proton-conductive resin were added to a mixed dispersion medium of water and ethanol and stirred, to prepare a dispersion B. Then, the dispersion A and the dispersion B were mixed and stirred, thereby preparing a catalyst dispersion for a cathode catalyst layer.

Separately, a catalyst dispersion for an anode catalyst layer was prepared in the same manner as in the case of the catalyst dispersion for a cathode catalyst layer except that the fibrous carbon material was not mixed.

Next, two PET sheets were provided. Using screen printing, the obtained catalyst dispersion for a cathode catalyst layer was applied in a uniform thickness to the smooth surface of one of the PET sheets, and the obtained catalyst dispersion for an anode catalyst layer was applied in a uniform thickness to the smooth surface of the other PET sheet. Thereafter, the PET sheets were dried to form two catalyst layers (each having a thickness of 10 µm).

Figure 3:
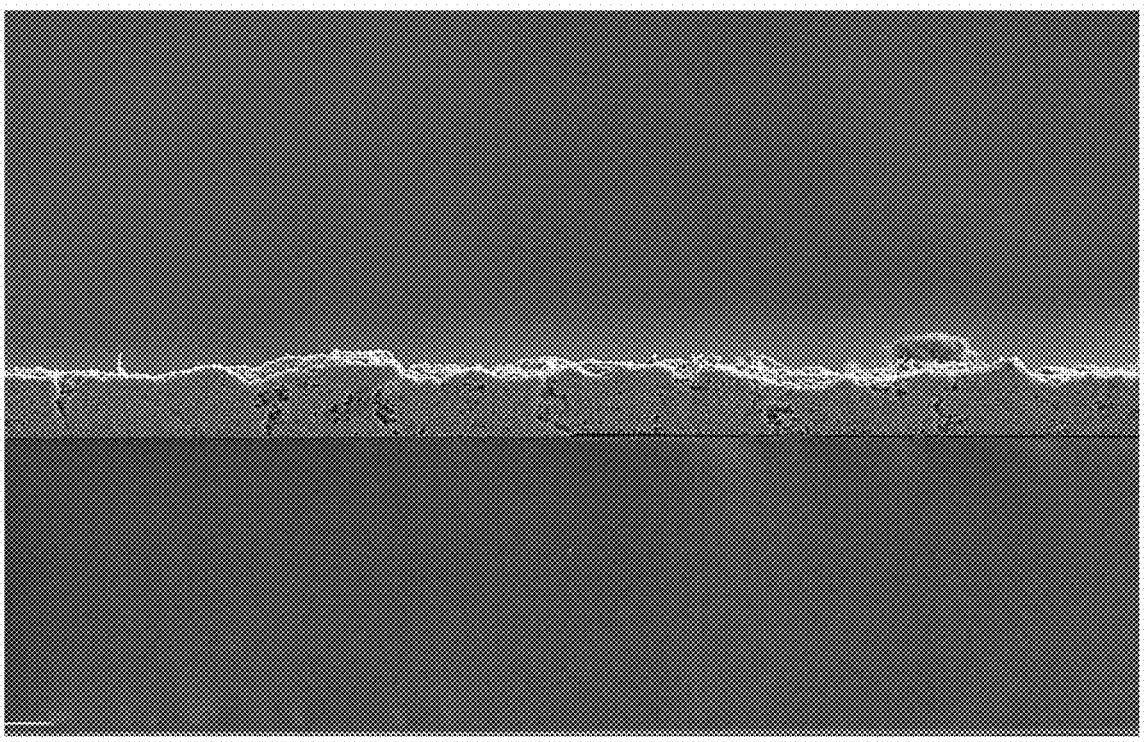
FIG. 3 is a photograph of a cross section of a catalyst layer produced in Example 1, taken with a scanning electron microscope (SEM).

A SEM photograph (magnification: 1000×) of the obtained cathode catalyst layer is shown in FIG. 3. Nine regions A were confirmed on a cross section with a width of approximately 110 µm of the cathode catalyst layer. Three of the regions A were connecting the first principal surface and the second principal surface of the cathode catalyst layer. Furthermore, four regions A satisfied the relationship: Ls<Lt. The average value of Lt/Ls in the four regions A was 1.43.

The nine regions A were spaced apart from each other by an average of 9 µm. The average value of the major diameters Lm, the average value of the lengths Ls, and the average value of the lengths Lt of these regions A were 6.5 µm, 4.6 µm, and 5.5 µm, respectively. The maximum diameter of the voids formed in each of the nine regions A was 0.04 µm to 50 µm. The ratio Va/V of the regions A to the catalyst layer was 25%.

Production of Unit Cell

Two sheets of carbon paper were provided as gas diffusion layers, and each of the obtained catalyst layers was transferred to one surface of the corresponding sheet of carbon paper. At this time, the catalyst layer was transferred to the corresponding gas diffusion layer such that the surface of the catalyst layer located opposite to the surface thereof that had opposed the PET sheet and the gas diffusion layer opposed each other.

Separately, an electrolyte membrane (perfluorocarbon sulfonic acid-based polymer) having a thickness of 15 µm was provided. The gas diffusion layers including the catalyst layers were respectively stacked on the two principal surfaces of the electrolyte membrane such that the catalyst layers abutted against the electrolyte membrane, and then thermally joined, thereby forming a cathode on one surface of the electrolyte membrane and an anode on the other surface.

Next, a frame-shaped seal member was disposed so as to surround the anode and the cathode. Then, a bridge plate for guiding a fuel or an oxidant to the corresponding gas diffusion layer was disposed in the vicinity of a manifold that had been formed in advance in the electrolyte membrane, and the whole was sandwiched by a pair of stainless steel flat plates (separators) each including a gas flow channel, thus completing a test unit cell A1.

Evaluation

The power generation performance of the unit cell A1 of Example 1 was evaluated.

Specifically, with the cell temperature being set at 80 degrees, a fuel gas (relative humidity: 70%, supply pressure: 0 kPa) was supplied to the anode so as to attain a utilization rate of 70%. An oxidant gas (relative humidity: 70%, supply pressure: 0 kPa) was supplied to the cathode so as to attain a utilization rate of 50%. Then, the voltage of the unit cell A1 was measured while controlling a load control device, and the maximum output density was calculated. The results are shown in Table 1.

Comparative Example 1

Catalyst layers were produced in the same manner as in Example 1 except that the fibrous carbon material was not used. As a result of observing cross sections of the obtained catalyst layers with a SEM, a circle E satisfying the above-described conditions could not be placed in the observation field of view, so that it was impossible to define the region A.

Then, using these catalyst layers, a unit cell B1 was produced and evaluated in the same manner as in Example 1. The results are shown in Table 1. Table 1 shows the relative value when the maximum output density of the unit cell B1 was taken as 100%.

TABLE 1

| Unit cell | A1 | B1 |
|---|---|---|
| Maximum output density (%) | 133 | 100 |

According to Table 1, the unit cell A1 has a higher output density than the unit cell B1. The reasons are presumably as follows: (1) the average cross-sectional area of the paths in which the gases travel was increased by the regions A; (2) the gas diffusion in the catalyst layers in the thickness direction and the plane direction (direction perpendicular to the thickness direction of the catalyst layers) was promoted; and (3) the travel distance of electrons and/or protons was reduced by the fibrous carbon material.

The unit cell A1 had a higher voltage than the unit cell B1 during power generation. Furthermore, as a result of varying the current density relative to the electrode area of each of the anode and the cathode in the range from 0 to 1.4 A/cm$^2$, and measuring the voltage (initial voltage) and the resistance value of each of the unit cells at that time, the difference in output density between the unit cell A1 and the unit cell B1 increased as the current density increased.

Note that the same catalyst dispersion as the catalyst dispersion for a cathode catalyst layer can be used as the catalyst dispersion for an anode catalyst layer. That is, the fibrous carbon material may be contained in the anode catalyst layer.

Example 2

A catalyst dispersion for a cathode catalyst layer was prepared in the following manner.

A particulate carbon material (carbon black) carrying catalyst particles (Pt—Co alloy) thereon was added to a proper amount of water, and dispersed by stirring. After a proper amount of ethanol was added to the resultant dispersion under stirring, 40 parts by mass of a proton-conductive resin (Nafion®) was added, per 100 parts by mass of the above-described particulate carbon material carrying 30 parts by mass of catalyst particles. Then, 13.5 parts by mass of a fibrous carbon material (VGCF, average diameter: 150 nm, average fiber length: 10 µm) and 40 parts by mass of a proton-conductive resin were further added and stirred, thereby preparing a catalyst dispersion for a cathode catalyst layer.

Figure 4:
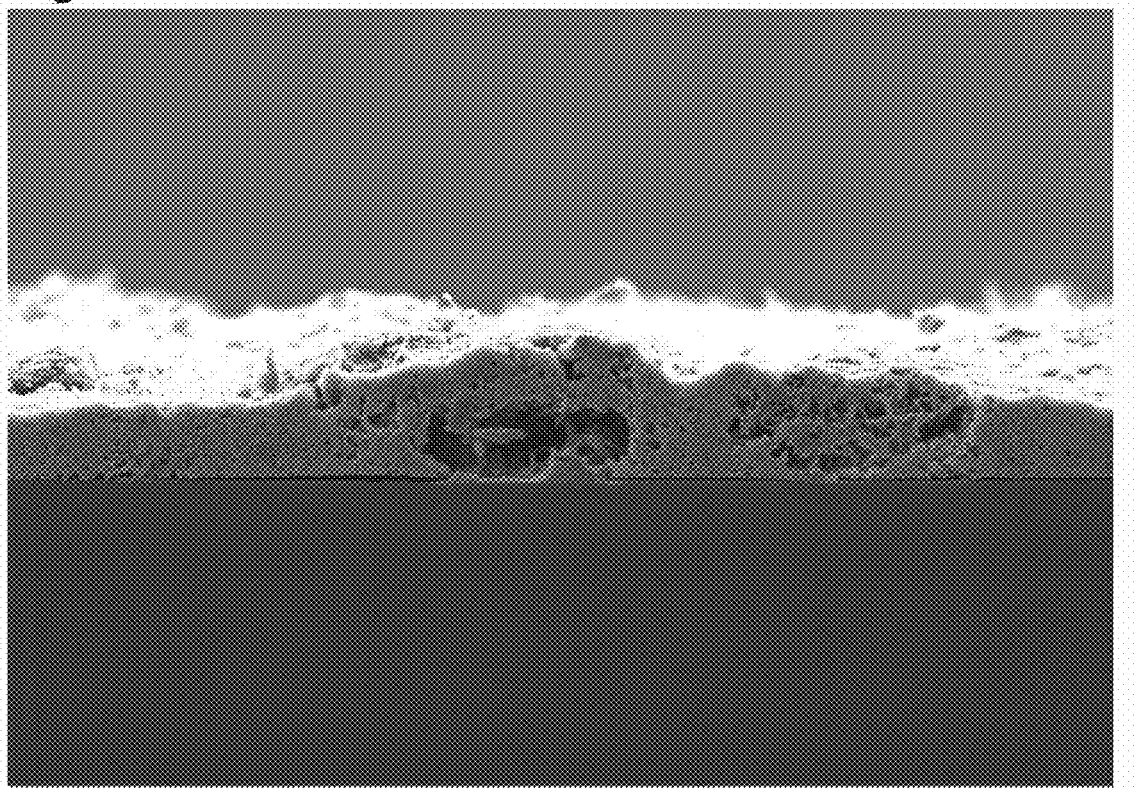
FIG. 4 is a photograph of a cross section of a catalyst layer produced in Example 2, taken with a scanning electron microscope (SEM).

Catalyst layers were formed in the same manner as in Example 1 except that the obtained catalyst dispersion was used. A SEM photograph (magnification: 2000×) of the cathode catalyst layer is shown in FIG. 4. Two regions A were confirmed on a cross section with a width of approximately 60 µm of the cathode catalyst layer. Neither of the regions A satisfied Ls<Lt.

The two regions A were spaced apart by 4.91 µm. The major diameters Lm of these regions A were 11.1 µm and 12.2 in this order as viewed from the left, and the average value was 11.7 µm. In the left region A, the major diameter and the maximum diameter of the voids substantially matched, and the maximum diameter of the voids formed in the left region A was 11.1 µm. The maximum diameter of the voids formed in the right region A was 3.06 µm. The ratio Va/V of the regions A to the catalyst layer was 43.9%.

B. Second Mode (1) Membrane Electrode Assembly

A membrane electrode assembly according to the present mode includes a catalyst layer including a first principal surface and a second principal surface, a gas diffusion layer disposed on the first principal surface, and an electrolyte membrane disposed on the second principal surface. The catalyst layer includes a fibrous carbon material, catalyst particles, a particulate carbon material, and a proton-conductive resin.

Figure 5:
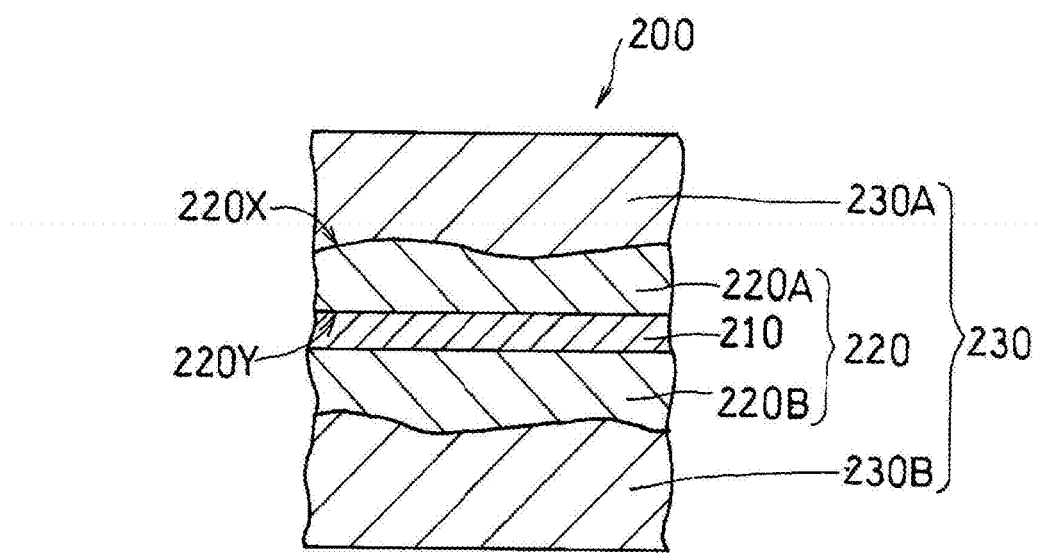
FIG. 5 is a cross-sectional view schematically showing the structure of a membrane electrode assembly according to a second mode of the present invention.
Figure 6:
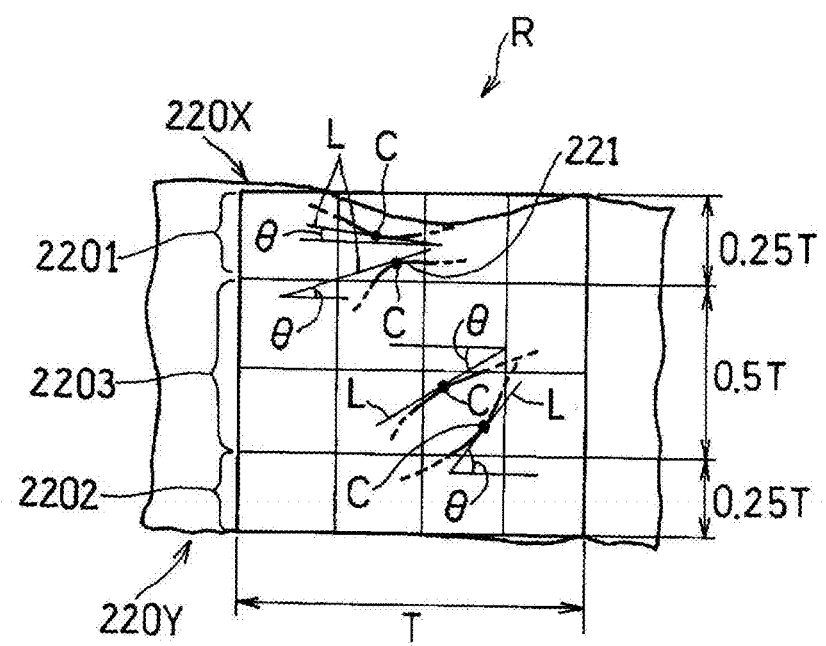
FIG. 6 is an explanatory diagram illustrating a calculation method of the orientation angle of a fibrous carbon material, using a cross section of a catalyst layer.

In the following, a membrane electrode assembly according to the present mode will be described with reference to FIGS. 5 and 6. FIG. 5 is a cross-sectional view schematically showing the structure of a membrane electrode assembly 200. FIG. 6 is an explanatory diagram illustrating a calculation method of the orientation angle of a fibrous carbon material, using a cross section of a catalyst layer.

The membrane electrode assembly 200 includes a first catalyst layer 220A, a first gas diffusion layer 230A disposed on the first principal surface 220X side of the first catalyst layer 220A, and an electrolyte membrane 210 disposed on the second principal surface 220Y side of the first catalyst layer 220A. Similarly, a second catalyst layer 220B and a second gas diffusion layer 230B are stacked in this order on the other principal surface of the electrolyte membrane 210. At least one of the first catalyst layer 220A and the second catalyst layer 220B may include the configuration of a catalyst layer 220, which is shown below.

(Catalyst Layer)

The catalyst layer 220 includes a fibrous carbon material 221 (see FIG. 6), catalyst particles, a particulate carbon material, and a proton-conductive resin (all not shown). The catalyst layer 220 includes, where T represents the thickness thereof, a first region 2201 extending from the first principal surface 220X to 0.25 T, a second region 2202 extending from the second principal surface 220Y of the catalyst layer 220 to 0.25 T, and a third region 2203 other than the first region 2201 and the second region 2202. The fibrous carbon material 221 includes a first fibrous carbon material (hereinafter simply referred to as "first fibers") oriented along the first principal surface 220X, and a second fibrous carbon material (hereinafter simply referred to as "second fibers") oriented along the thickness direction of the catalyst layer 220.

The present mode is characterized in that the ratio R1:$FF_1/SF_1$ of the number $FF_1$ of the first fibers to the number $SF_1$ of the second fibers in the first region 2201 of the catalyst layer 220, the ratio R2:$FF_2/SF_2$ of the number $FF_2$ of the first fibers to the number $SF_2$ of the second fibers in the second region 2202, and the ratio R3:$FF_3/SF_3$ of the number $FF_3$ of the first fibers to the number $SF_3$ of the second fibers in the third region 2203 satisfy at least one of the relationships: R3<R1 and R3<R2. In other words, in the third region 2203, the ratio of the second fibers oriented along the thickness direction of the catalyst layer 220 is higher than that in at least one of the first region 2201 and the second region 2202.

Since the third region 2203 located on the inside of the catalyst layer 220 includes a relatively large number of the second fibers oriented along the thickness direction of the catalyst layer 220, the gas diffusion in the thickness direction is particularly improved, and the water generated by the reaction between the fuel and the oxidant can be easily discharged.

The first region 2201 disposed on the gas diffusion layer 130 side is the region into which a gas (the fuel or the oxidant) initially flows. That is, the first region 2201 is the region serving an important role in the gas diffusion. Since the first region 2201 includes a relatively large number of first fibers oriented along the first principal surface 220X, the gas diffusion in the plane direction is particularly improved. Accordingly, the gas diffusion can be improved in both the thickness direction and the plane direction. Furthermore, due to a higher ratio of the first fibers, the interface (contact interface) between the gas diffusion layer 130 and the catalyst layer 220 can be easily increased. Accordingly, the adhesion between the catalyst layer 220 and the gas diffusion layer 230 is increased, so that the interfacial separation can be easily inhibited.

The second region 2202 disposed on the electrolyte membrane 210 side is the region serving an important role in the traveling of protons to the electrolyte membrane 210, or when electrons travel from the interface between the electrolyte membrane 210 and the catalyst layer 220 to the interface between the catalyst layer 220 and the gas diffusion layer 230. Since the second region 2202 includes a relatively large number of first fibers oriented along the first principal surface 220X, the contact interface between the carbon material (in this case, the first fibers) and the electrolyte membrane is increased, so that the efficiency of the electrochemical reaction is increased and the electrical resistance is reduced.

If the ratio R3 and the ratio R1 satisfy R3<R1, the ratio R2 and the ratio R3 may not need to satisfy R3<R2. In this case, the ratio R1 and the ratio R2 may satisfy R2<R1.

If the ratio R3 and the ratio R2 satisfy R3<R2, the ratio R1 and the ratio R3 may not need to satisfy R3<R1. In this case, the ratio R1 and the ratio R2 may satisfy R1<R2.

The present mode may include the following three embodiments, for example.

First Embodiment

The present embodiment satisfies R3<R2. Furthermore, the present embodiment satisfies R3≥R1, and also satisfies R1<R2.

That is, in the present embodiment, in addition to the third region 2203, the first region 2201 located on the gas diffusion layer 230 side also includes a large number of the second fibers oriented along the thickness direction of the catalyst layer 220. In this case, at least a part of the second fibers can be partially stuck into the gas diffusion layer. That is, the second fibers may be present straddling the catalyst layer 220 and the gas diffusion layer 230. In this case, the gas transport resistance on the interface between the gas diffusion layer and the catalyst layer 220 is reduced. Furthermore, the adhesion between the catalyst layer 220 and the gas diffusion layer 230 is increased, so that the interfacial separation can be easily inhibited. In addition, the gas diffusion in the thickness direction of the catalyst layer 220 is further improved.

On the other hand, the second region 2202 located on the electrolyte membrane 210 side includes a relatively large number of first fibers oriented along the first principal surface 220X. Accordingly, as described above, the efficiency of the electrochemical reaction is increased, and the electrical resistance is reduced.

Second Embodiment

The present embodiment satisfies R3<R1. Furthermore, the present embodiment satisfies R3≥R2, and also satisfies R2<R1.

That is, in the present embodiment, in addition to the third region 2203, the second region 2202 located on the electrolyte membrane 210 side also includes a large number of second fibers oriented along the thickness direction of the catalyst layer 220.

Since the second region 2202 includes a large number of second fibers oriented along the thickness direction of the catalyst layer 220, the travel distance of protons or electrons is reduced, so that the efficiency of the electrochemical reaction is increased, and the resistance is reduced.

On the other hand, since the first region 220 disposed on the gas diffusion layer 230 side includes a large number of first fibers oriented along the first principal surface 220X, the gas diffusion is improved particularly in the plane direction, and the interfacial separation between the catalyst layer 220 and the gas diffusion layer 230 can be easily inhibited, as described above.

Third Embodiment

The present embodiment satisfies R3<R1, and also satisfies R3<R2. In this case, R1≈R2 may be satisfied.

That is, in the present embodiment, the third region 2203 includes a large number of second fibers oriented along the thickness direction of the catalyst layer 220, whereas the first region 2201 and the second region 2202 include a large number of first fibers oriented along the first principal surface 220X. Accordingly, as described above, the gas diffusion can be improved in both the thickness direction and the plane direction, and the interfacial separation between the catalyst layer 220 and the gas diffusion layer 230 can be easily inhibited. Furthermore, the efficiency of the electrochemical reaction is increased, and the resistance is reduced.

The fibrous carbon material 221 being oriented along the first principal surface 220X means that the fibrous carbon material 221 is oriented at an orientation angle θ of 0° or more and less than 45°, relative to the first principal surface 220X. The fibrous carbon material 221 being oriented along the thickness direction of the catalyst layer 220 means that the fibrous carbon material 221 is oriented at an orientation angle θ of 45° or more and 90° or less, relative to the first principal surface 220X. Here, when the first principal surface 220X has irregularities, a surface perpendicular to the thickness direction of the catalyst layer 220, or the smooth second principal surface 220Y, may be used as a reference based on which the orientation angle θ is determined.

The orientation angle θ of the fibrous carbon material 221 is determined in the following manner, using FIG. 6. Only a part of the fibrous carbon material 221 is shown in FIG. 6.

First, an image of a cross section of the catalyst layer 220 along the thickness direction is captured using a scanning electron microscope (SEM). For example, a square region (hereinafter referred to as "designated region R) whose one side has a length equal to the thickness T of the catalyst layer 220 and in which 20 or more pieces of the fibrous carbon material 221 can be confirmed is determined from the obtained SEM image. The designated region R can be determined in the following manner. First, a straight line is drawn along the thickness direction of the catalyst layer 220. The intersection point between the straight line and the second principal surface 220Y is defined as one of the vertexes of a square representing the designated region R. Next, two sides each having a length of T and intersecting perpendicularly to each other are drawn from the vertex, and the other two sides are drawn so as to form a square including the earlier-drawn two sides.

Next, the designated region R is further divided into 16 (4×4) cells. For all of the pieces of fibrous carbon material 221 that can be confirmed in one cell, a tangent L is drawn at a midpoint C of the observable length. The angle (90° or less) formed between the tangent L and the first principal surface 220X is determined to be the orientation angle θ of the fibrous carbon material 221. Note that, in FIG. 6, the orientation angle θ is determined with reference to the surface perpendicular to the thickness direction of the catalyst layer 220.

If the orientation angle θ obtained in this manner is 0° or more and less than 45°, the fibrous carbon material 221 is determined to be the first fiber. On the other hand, if the orientation angle θ is 45° or more and 90° or less, the fibrous carbon material 221 is determined to be the second fiber. When a plurality of pieces of fibrous carbon material 221 can be confirmed in one cell, the tangent L is drawn for all of the pieces of fibrous carbon material 221 in the same manner, and the respective orientation angles θ are determined. The same operation is performed for the remaining 15 cells.

Finally, the ratio $R1:FF_1/SF_1$ between the total number $FF_1$ of the first fibers and the total number $SF_1$ of the second fibers that are included in the four cells corresponding to the first region 2201 is calculated. Similarly, the ratio $R2:FF_2/SF_2$ between the total number $FF_2$ of the first fibers and the total number $SF_2$ of the second fibers that are included in the four cells corresponding to the second region 2202 is calculated. Furthermore, similarly, the ratio $R3:FF_3/SF_3$ between the total number $FF_3$ of the first fibers and the total number $SF_3$ of the second fibers that are included in the eight cells corresponding to the third region 2203 is calculated. The fibrous carbon material 221 may be identified, for example, by binarizing the SEM image.

The ratio $R3:FF_3/SF_3$ in the third region 2203 is not particularly limited. From the viewpoint of the gas diffusion in the thickness direction, the ratio $R3:FF_3/SF_3$ may be smaller than 1, and may be 0.9 or less. From the viewpoint of the electrical resistance, the ratio $R3:FF_3/SF_3$ may be 0.5 or more.

The above-described ratios FF/SF in the first region 2201 and the second region 2202 are not particularly limited.

If R3<R2 is satisfied, the ratio $R2:FF_2/SF_2$ is, for example, 1 or more, and is 1.1 or more. The ratio $R2:FF_2/SF_2$ is, for example, 2 or less. In this case, the ratio $R1:FF_1/SF_1$ is, for example, smaller than 1, and is 0.9 or less. The ratio $R1:FF_1/SF_1$ may be 0.5 or more.

If $R3<R1$ is satisfied, the ratio $R1:FF_1/SF_1$ is, for example, 1 or more, and 1.1 or more. The ratio $R1:FF_1/SF_1$ is, for example, 2 or less. In this case, the ratio $R2:FF_2/SF_2$ is, for example, smaller than 1, and is 0.9 or less. The ratio $R2:FF_2/SF_2$ may be 0.5 or more.

As described above, in the membrane electrode assembly 200, a part of the fibrous carbon material 221 is not just present inside the catalyst layer 220, but can be present straddling the catalyst layer 220 and the gas diffusion layer 230. In this case, the adhesion between the catalyst layer 220 and the gas diffusion layer 230 is increased, so that the interfacial separation can be easily inhibited. In particular, the second fibers are likely to be disposed straddling the catalyst layer 220 and the gas diffusion layer 230. As a result of the second fibers being disposed straddling the catalyst layer 220 and the gas diffusion layer 230, the interfacial separation can be further inhibited.

Figure 7:
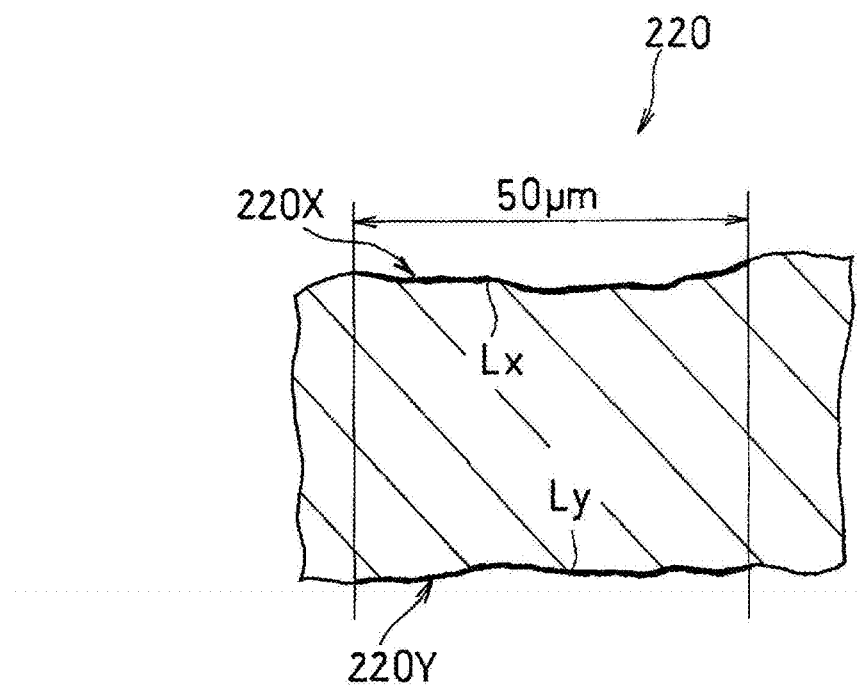
FIG. 7 is an explanatory diagram illustrating a calculation method of the bending degree of principal surfaces of a catalyst layer, using a cross section of the catalyst layer.

The first principal surface 220X of the catalyst layer 220 may be rougher than the second principal surface 220Y. When the first principal surface 220X of the catalyst layer 220 is rough, the adhesion between the catalyst layer 220 and the gas diffusion layer 230 is increased, so that the interfacial separation can be easily inhibited. In addition, the surface area of the first principal surface 220X is increased, thus further improving the gas diffusion. On the other hand, when the second principal surface 220Y is smooth, the durability of the catalyst layer 220 is improved. The reason is that this inhibits the localization of the current flowing into the electrolyte membrane 210 or flowing out of the electrolyte membrane 210 when the fuel cell is operated, As for the roughnesses of the first principal surface 220X and the second principal surface 220Y, the bending degrees of the principal surfaces that can be determined in the following manner may be compared. As shown in FIG. 7, the bending degree of each of the principal surfaces is calculated from a SEM image obtained by capturing an image of a cross section of the catalyst layer 220 along the thickness direction. When a region with a width of 50 μm in a direction perpendicular to the thickness direction of the catalyst layer 220 is observed in the SEM image, the numerical values obtained by dividing the length Lx of the first principal surface 220X and the length Ly of the second principal surface 220Y each by a width 50 μm of the region are the bending degrees of the respective principal surfaces.

From the viewpoint of the adhesion and the gas diffusion, the first bending degree of the first principal surface 220X may be 1.01 to 1.5. A catalyst layer 220 having a first bending degree within this range can be easily formed. From the viewpoint of inhibiting the current localization, the second bending degree of the second principal surface 220Y may be 1 to 1.3.

(Fibrous Carbon Material)

Examples of the fibrous carbon material 221 include vapor grown carbon fiber (VGCF), carbon nanotube, and carbon nanofiber. The length of the fibrous carbon material 221 is not particularly limited. In particular, since the second fiber can be easily disposed, the average fiber length of the fibrous carbon material 221 may be 0.2 to 20 and may be 0.2 to 10 μm. The average fiber length can be calculated, for example, by arbitrarily collecting 10 pieces of the fibrous carbon material 221 from the catalyst layer 220, and averaging their fiber lengths. The diameter of the fibrous carbon material is not particularly limited. In particular, since the path for a gas can be easily secured, the average diameter of the fibrous carbon material 221 may be 5 to 200 nm, and may be 10 to 150 nm. Similarly, the average diameter can be calculated, for example, by arbitrarily collecting 10 pieces of the fibrous carbon material 221 from the catalyst layer 220, and averaging their diameters. The diameter is the length in a direction perpendicular to the length direction of the fibrous carbon material 221.

(Catalyst Particles)

The catalyst particles are not particularly limited, and examples thereof include catalyst metals such as alloys and simple substances selected from Sc, Y, Ti, Zr, V, Nb, Fe, Co, Ni, Ru, Rh, Pd, Pt, Os, Ir, lanthanoid series elements, and actinoid series elements. Examples of the catalyst particles used for the anode include Pt—Ru alloys. Examples of the catalyst metal used for the cathode include Pt and Pt—Co alloys. At least a part of the catalyst particles is supported on the particulate carbon material. The catalyst particles may also be supported on the fibrous carbon material, as well as on the particulate carbon material. The reason is that the catalyst particles can easily come into contact with the gas, thus increasing the efficiency of the oxidation reaction or the reduction reaction of the gas.

(Particulate Carbon Material)

The particulate carbon material is not particularly limited, and may be carbon black because of the excellent conductivity. Examples of the carbon black include acetylene black, ketjen black, thermal black, furnace black, and channel black. The particle size of the carbon black (or the length of a structure composed of a plurality of connected primary particles) is not particularly limited, and it is possible to use any carbon black that has been conventionally used for the catalyst layers of fuel cells.

(Proton-Conductive Resin)

The proton-conductive resin is not particularly limited, and examples thereof include perfluorocarbon sulfonic acid-based polymers and hydrocarbon-based polymers. In particular, the proton-conductive resin may be a perfluorocarbon sulfonic acid-based polymer because of the excellent heat resistance and the chemical stability. Examples of the perfluorocarbon sulfonic acid-based polymers include Nafion®.

In the catalyst layer 220, the fibrous carbon material 221 may be included in an amount of 3 to 15 parts by mass, and may be included in an amount of 5 to 10 parts by mass, per 100 parts by mass of the total amount of the catalyst particles, the particulate carbon material, and the proton-conductive resin. The reason is that the fibrous carbon material 221 can be easily disposed in the desired state, so that the efficiency of the gas diffusion and the electrochemical reaction can be easily enhanced. From the same viewpoint, the ratio of the fibrous carbon material 221 in the carbon materials as a whole, including the particulate carbon material and the fibrous carbon material 221, may be 10 to 50 mass %, and may be 15 to 30 mass %.

The thickness T of the catalyst layer 220 may be small in consideration of the size reduction of the fuel cell, but may not need to be too small in view of the strength. The thickness T of the catalyst layer 220 may be 10 μm to 60 μm for example. The thickness T of the catalyst layer 220 is an average value of the distances from one principal surface to the other principal surface at 10 arbitrary locations. For example, the thickness T of the catalyst layer 220 can be calculated by averaging the distances measured when straight lines are drawn from the first principal surface 220X to the second principal surface 220Y along the thickness direction of the catalyst layer 220 for 10 arbitrary locations in an SEM image of a cross section (width: 100 μm) of the catalyst layer 220.

(Electrolyte Membrane)

As the electrolyte membrane 210, a polymer electrolyte membrane can be preferably used. Examples of the material of the polymer electrolyte membrane include the polymer electrolytes given as the examples of the proton-conductive resin. The thickness of the electrolyte membrane 210 is 5 to 30 μm for example.

(Gas Diffusion Layer)

A conductive porous base material can be used as the gas diffusion layer 230. For example, the conductive porous base material is formed of a carbonaceous material such as carbon black, graphite, and carbon fiber. Specific examples thereof include carbon paper, carbon cloth, and a porous conductive carbon sheet obtained by forming a composition including a carbon material and a binder into a sheet.

The membrane electrode assembly 200 is produced, for example, in the following manner.

First, an electrolyte membrane 210 and two gas diffusion layers 230 are provided. Separately, catalyst particles and a particulate carbon material are mixed in a dispersion medium (e.g., water ethanol, propanol or the like), to give a dispersion. A proton-conductive resin and a fibrous carbon material 221 are successively added to the resultant dispersion under stirring, to give a catalyst dispersion. The proton-conductive resin may be added in two portions. In this case, addition of the second portion of the proton-conductive resin may be carried out together with addition of the fibrous carbon material 221.

Subsequently, the obtained catalyst dispersion is applied in a uniform thickness to each of the surfaces of two suitable transfer base material sheets, and dried, to form two catalyst layers 220. For example, due to the convection of the dispersion medium that occurs during drying, at least a part of the fibrous carbon material 221 may rise and become the second fibers. A large number of second fibers are likely to be formed in a region located toward the surface located opposite to the surface that has opposed the transfer base material sheet.

Next, the obtained two catalyst layers 220 are respectively transferred to the principal surfaces of the corresponding gas diffusion layers 230, while the surfaces located opposite to the surfaces that have opposed the transfer base material sheets of the catalyst layers 220 oppose the two gas diffusion layers 230 respectively. Finally, the gas diffusion layers 230 including the catalyst layers 220 are respectively stacked on the two principal surfaces of the electrolyte membrane 210 such that the catalyst layers 220 oppose the electrolyte membrane 210. In this case, a membrane electrode assembly 200 corresponding to the above-described first embodiment is obtained. Alternatively, after applying the catalyst dispersion directly to the two principal surfaces of the electrolyte membrane 210, the gas diffusion layers 230 may be stacked on the respective corresponding principal surfaces. In these cases, the second bending degree of the second principal surface 220Y can be smaller than the first bending degree of the first principal surface 220X.

Alternatively, the obtained two catalyst layers 220 are respectively transferred to the principal surfaces of the electrolyte membrane 210, while the surfaces of the catalyst layers 220 that are located opposite to the surfaces thereof that have opposed the transfer base material sheets oppose the electrolyte membrane 210. Finally, the gas diffusion layers 230 are stacked on the respective corresponding principal surfaces of the catalyst layers 220. In this case, a membrane electrode assembly 200 corresponding to the second embodiment is obtained. Alternatively, after forming two gas diffusion layers 230 including the catalyst layers 220 by applying the catalyst dispersion directly to the two gas diffusion layers 230, the gas diffusion layers 230 may be respectively stacked on the two principal surfaces of the electrolyte membrane 210.

Alternatively, the catalyst dispersion is applied directly to both of the principal surfaces of the electrolyte membrane 210 and one surface of each of the two gas diffusion layers 230, to form an electrolyte membrane 210 and gas diffusion layers 230 each including a precursor (precursor layer) of the catalyst layer. Then, the two gas diffusion layers 230 are stacked so as to sandwich the electrolyte membrane 210. At this time, the precursor layers formed on the gas diffusion layers 230 oppose the precursor layers formed on the electrolyte membrane 210. In this case, a membrane electrode assembly 200 corresponding to the above-described third embodiment is obtained.

Examples of the application method of the catalyst dispersion include conventional application methods, including, for example, spraying and screen printing, and coating methods using various coaters such as a blade coater, a knife coater, and a gravure coater. As the transfer base material sheets, it is possible to use, for example, a sheet having a smooth surface, such as a polyethylene terephthalate (PET) sheet and a polypropylene sheet.

(2) Fuel Cell

A fuel cell according to the present embodiment includes an electrolyte membrane, a first catalyst layer and a second catalyst layer that are disposed so as to sandwich the electrolyte membrane, a first gas diffusion layer and a second gas diffusion layer that are disposed so as to sandwich the electrolyte membrane via the first catalyst layer and second catalyst layer respectively, and a first separator and a second separator that are disposed so as to sandwich the electrolyte membrane via the first gas diffusion layer and the second gas diffusion layer respectively.

The fuel cell includes the above-described membrane electrode assembly 200 as the membrane electrode assembly. In other words, the fuel cell according to the present embodiment includes the above-described electrolyte membrane 210 as the electrolyte membrane, the above-described catalyst layer 220 as at least one of the first catalyst layer 220A and the second catalyst layer 220B, and the above-described gas diffusion layer 230 as at least one of the first gas diffusion layer 230A and the second gas diffusion layer 230B.

Figure 8A:
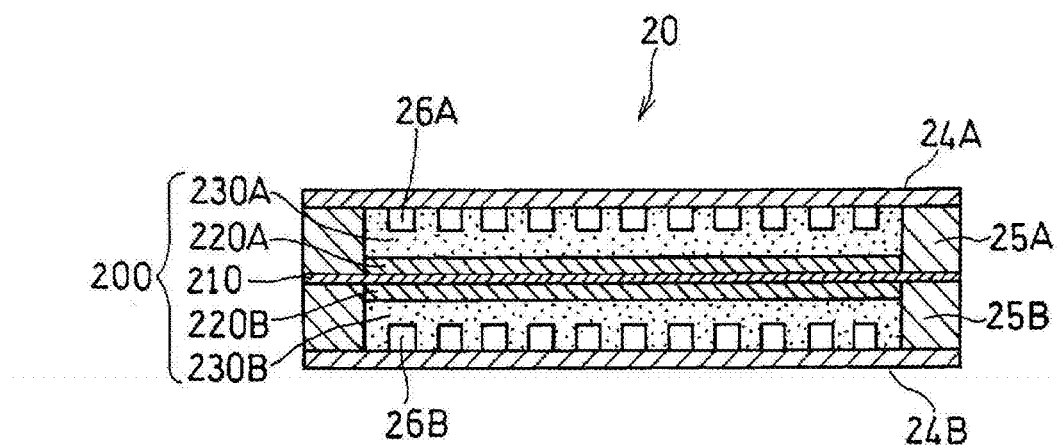
FIG. 8A is a cross-sectional view schematically showing the structure of a unit cell of a fuel cell according to the second mode of the present invention.
Figure 8B:
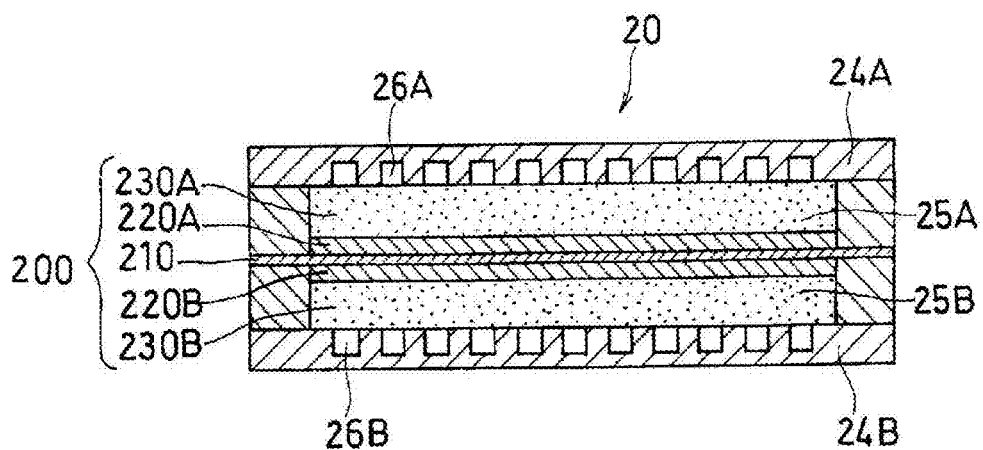
FIG. 8B is a cross-sectional view schematically showing the structure of another unit cell of the fuel cell according to the second mode of the present invention.

In the following, an example of the structure of the fuel cell according to the present embodiment will be described with reference to FIGS. 8A and 8B. FIG. 8A is a cross-sectional view schematically showing the structure of a unit cell disposed in the fuel cell according to the present embodiment. FIG. 8B is a cross-sectional view schematically showing the structure of another unit cell disposed in the fuel cell according to the present embodiment. Ordinarily, a plurality of unit cells are stacked, and disposed as a cell stack in the fuel cell. For the sake of convenience, one unit unit cell is shown in FIGS. 8A and 8B.

A unit cell 20 includes an electrolyte membrane 210, a first catalyst layer 220A and a second catalyst layer 220B that are disposed so as to sandwich the electrolyte membrane 210, a first gas diffusion layer 230A and a second gas diffusion layer 230B that are disposed so as to sandwich the electrolyte membrane 210 via the first catalyst layer 220A and the second catalyst layer 220B respectively, and a first separator 24A and a second separator 24B that are disposed so as to sandwich the electrolyte membrane 210 via the first gas diffusion layer 230A and the second gas diffusion layer 230B respectively. One of the first catalyst layer 220A and the second catalyst layer 220B functions as an anode, and the other functions as a cathode. The electrolyte membrane 210 is one size larger than the first catalyst layer 220A and the second catalyst layer 220B, and, therefore, the peripheral edge portion of the electrolyte membrane 210 protrudes from the first catalyst layer 220A and the second catalyst layer 220B. The peripheral edge portion of the electrolyte membrane 210 is sandwiched by a pair of seal members 25A and 25B.

(Catalyst Layer)

At least one of the first catalyst layer 220A and the second catalyst layer 220B is the above-described catalyst layer 220. When the first catalyst layer 220A or the second catalyst layer 220B is not the above-described catalyst layer 220, a known material and a known configuration can be used for the catalyst layers.

(Gas Diffusion Layer)

At least one of the first gas diffusion layer 230A and the second gas diffusion layer 230B is the above-described gas diffusion layer 230. Both of the first gas diffusion layer 230A and the second gas diffusion layer 230B may have the same configuration as that of the above-described gas diffusion layer 230.

As shown in FIG. 8A, a gas flow channel 26A may be formed on the surface of the first gas diffusion layer 230A that abuts against the first separator 24A. A gas flow channel 26B may be formed on the surface of the second gas diffusion layer 230B that abuts against the second separator 24B. The shape of the gas flow channels is not particularly limited, and the gas flow channels may be formed in a parallel configuration or a serpentine configuration, for example.

(Separator)

The first separator 24A and the second separator 24B may have airtightness, electron conductivity, and electrochemical stability, and the material thereof is not particularly limited. As such a material, a carbon material, a metal material, and the like are preferred. The metal material may be coated with carbon. For example, the first separator 24A and the second separator 24B can be obtained by punching a metal plate into a predetermined shape, and subjecting the metal plate to surface treatment.

As shown in FIG. 8B, a gas flow channel 26A may be formed on the surface of the first separator 24A that abuts against the first gas diffusion layer 230A. A gas flow channel 26B may be formed on the surface of the second gas diffusion layer 230B that abuts against the second separator 24B. The shape of the gas flow channels is not particularly limited, and the gas flow channels may be formed in a parallel configuration or a serpentine configuration, for example. Note that each of the gas flow channels 26A and 26B may be formed in at least one of the corresponding gas diffusion layer and the corresponding separator.

(Seal Member)

The seal members 25A and 25B are materials having elasticity, and prevent a fuel and/or an oxidant from leaking from the gas flow channels 26A and 26B. For example, the seal members 25A and 25B may have the shape of a frame surrounding, in a loop manner, the peripheral edge portions of the first catalyst layer 220A and the second catalyst layer 220B. A known material and a known configuration may be used for each of the seal members 25A and 25B.

In the following, the present embodiment will be described in further detail by way of examples. However, it should be noted that the present embodiment is not limited to the following examples.

Example 3

Production of Membrane Electrode Assembly

A particulate carbon material (carbon black) carrying catalyst particles (Pt—Co alloy) thereon was added to a proper amount of water, and dispersed by stirring. After a proper amount of ethanol was added to the resultant dispersion under stirring, 40 parts by mass of a proton-conductive resin (Nafion®) was added, per 100 parts by mass of the above-described particulate carbon material carrying 30 parts by mass of the catalyst particles, to prepare a dispersion A. Separately, 13.5 parts by mass of a fibrous carbon material (VGCF, average diameter: 150 nm, average fiber length: 10 μm) and 40 parts by mass of a proton-conductive resin were added to a mixed dispersion medium of water and ethanol and stirred, to prepare a dispersion B. Then, the dispersion A and the dispersion B were mixed and stirred, thereby preparing a catalyst dispersion for a cathode catalyst layer.

Separately, a catalyst dispersion for an anode catalyst layer was prepared in the same manner as in the case of the catalyst dispersion for a cathode catalyst layer except that the fibrous carbon material was not mixed.

Next, two PET sheets were provided. Using screen printing, the obtained catalyst dispersion for a cathode catalyst layer was applied in a uniform thickness to the smooth surface of one of the PET sheets, and the obtained catalyst dispersion for an anode catalyst layer was applied in a uniform thickness to the smooth surface of the other PET sheet. Thereafter, the PET sheets were dried to form two catalyst layers (each having a thickness of 10 μm).

Two sheets of carbon paper were provided as gas diffusion layers, and each of the obtained catalyst layers was transferred to one surface of the corresponding sheet of carbon paper. At this time, the catalyst layer was transferred to the corresponding gas diffusion layer such that the surface of the catalyst layer located opposite to the surface thereof that had opposed the PET sheet and the gas diffusion layer opposed each other.

Separately, an electrolyte membrane (perfluorocarbon sulfonic acid-based polymer) having a thickness of 15 μm was provided. The gas diffusion layers including the catalyst layers were respectively stacked on the two principal surfaces of the electrolyte membrane such that the catalyst layers opposed the electrolyte membrane, and then thermally joined, thereby forming a cathode on one surface of the electrolyte membrane and an anode on the other surface to produce a membrane electrode assembly.

An image of a cross section of the obtained membrane electrode assembly was captured using a SEM. From the SEM image, the orientation angle θ was obtained according to the above-described method that used FIG. 6, to determine the first fiber and the second fiber. The ratio R1:$FF_1/SF_1$, the ratio R2:$FF_2/SF_2$, and the ratio R3:$FF_3/SF_3$, calculated from the total number of each of these fibers, were 0.75, 1.1, and 0.9 respectively. From the SEM image, it was also confirmed that a part of the fibrous carbon material was disposed so as to straddle the catalyst layer and the gas diffusion layer, and that a part of the catalyst particles was supported on the fibrous carbon material. Similarly, the first bending degree of the first principal surface and the second bending degree of the second principal surface, calculated from the SEM image, were 1.21 and 1.08 respectively.

Production of Unit Cell

A frame-shaped seal member was disposed so as to surround the anode and the cathode. Then, a bridge plate for guiding a fuel or an oxidant to the corresponding gas diffusion layer was disposed in the vicinity of a manifold that had been formed in advance in the electrolyte membrane, and the whole was sandwiched by a pair of stainless steel flat plates (separators), thus completing a test unit cell X1.

Evaluation

The power generation performance of the produced unit cell X1 was evaluated. Specifically, with the cell temperature being set at 80 degrees, a fuel gas (relative humidity: 70%, supply pressure: 0 kPa) was supplied to the anode so as to attain a utilization rate of 70%. An oxidant gas (relative humidity: 70%, supply pressure: 0 kPa) was supplied to the cathode so as to attain a utilization rate of 50%. Then, the voltage of the unit cell X1 was measured while controlling a load control device, and the maximum output density was calculated. The results are shown in Table 2.

Example 4

A membrane electrode assembly was produced in the following manner.

Two catalyst layers that had been formed on PET sheets were provided in the same manner as in Example 3.

An electrolyte membrane (perfluorocarbon sulfonic acid-based polymer) having a thickness of 15 μm was provided.

Two sheets of carbon paper were provided as gas diffusion layers.

The catalyst layers were respectively transferred to the two principal surfaces of the electrolyte membrane, to form a cathode on one surface of the electrolyte membrane and an anode on the other surface. At this time, each of the catalyst layers was transferred such that the surface located opposite to the surface that had opposed the PET sheet opposed the electrolyte membrane.

Next, a frame-shaped seal member was disposed so as to surround the anode and the cathode. Next, the surface of one of the gas diffusion layers located opposite to a rib-forming surface thereof was abutted against the anode. Similarly, the surface of the other gas diffusion layer located opposite to a rib-forming surface thereof was abutted against the cathode, to produce a membrane electrode assembly.

An image of a cross section of the obtained membrane electrode assembly was captured using a SEM. The ratio R1:$FF_1/SF_1$, the ratio R2:$FF_2/SF_2$, and the ratio R3:$FF_3/SF_3$, calculated from the SEM image in the same manner as in Example 3, were 1.2, 0.85, and 0.85 respectively. From the SEM image, it was also confirmed that a part of the fibrous carbon material was disposed so as to straddle the catalyst layer and the gas diffusion layer, and that a part of the catalyst particles was supported on the fibrous carbon material. Similarly, the first bending degree of the first principal surface and the second bending degree of the second principal surface, calculated from the SEM image, were 1.08 and 1.21 respectively.

Then, a test unit cell X2 was produced and evaluated in the same manner as in Example 3 except that the obtained membrane electrode assembly was used. The results are shown in Table 2.

Comparative Example 2

Catalyst layers and a unit cell Y1 were produced and evaluated in the same manner as in Example 3 except that the fibrous carbon material was not used. The results are shown in Table 2. Table 2 shows the relative value when the maximum output density of the unit cell Y1 was taken as 100%.

TABLE 2

| Unit cell | X1 | X2 | Y1 |
|---|---|---|---|
| Maximum output density (%) | 133 | 103 | 100 |

According to Table 2, the unit cells X1 and X2 have higher output densities than the unit cell Y1. The reasons are presumably as follows: (1) the average cross-sectional area of the paths in which the gases travel was increased by the second region; (2) the gas diffusion in the catalyst layer in the thickness direction and the plane direction (direction perpendicular to the thickness direction of the catalyst layer) was promoted; and (3) the travel distance of electrons and/or protons was reduced by the fibrous carbon material.

The unit cells X1 and X2 had higher voltages than the unit cell Y1 during power generation. Furthermore, as a result of varying the current density relative to the electrode area of each of the anode and the cathode in the range from 0 to 1.4 A/cm$^2$, and measuring the voltage (initial voltage) and the resistance value of each of the unit cells at that time, the difference in output density between each of the unit cells X1 and X2 and the unit cell Y1 increased as the current density increased.

Note that the same catalyst dispersion as the catalyst dispersion for a cathode catalyst layer can be used as the catalyst dispersion for an anode catalyst layer. That is, the fibrous carbon material may be contained in the anode catalyst layer.

INDUSTRIAL APPLICABILITY

The fuel cell according to the present invention can be suitably used as a stationary power supply for a household cogeneration system, and a vehicle power supply. The present invention can be suitably applied to a polymer electrolyte fuel cell, but is not limited thereto, and can be applied to fuel cells in general.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

REFERENCE SIGNS LIST

100 . . . Catalyst layer
  100X . . . First principal surface
  100Y . . . Second principal surface
  101 . . . Region A
    1011 . . . Structure portion
    1012 . . . Void
  102 . . . Region B
10 . . . Fuel cell (unit cell)
  11 . . . Electrolyte membrane
  12A . . . First catalyst layer
  12B . . . Second catalyst layer
  13A . . . First gas diffusion layer 13B . . . Second gas diffusion layer
14A . . . First separator
14B . . . Second separator
15A, 15B . . . Seal member
16A, 16B . . . Gas flow channel
200 . . . Membrane electrode assembly
  210 . . . Electrolyte membrane
  220 . . . Catalyst layer
    220A . . . First catalyst layer
    220B . . . Second catalyst layer
    220X . . . First principal surface
    220Y . . . Second principal surface
      2201 . . . First region
      2202 . . . Second region
    221 . . . Fibrous carbon material
  230 . . . Gas diffusion layer
    230A . . . First gas diffusion layer
    230B . . . Second gas diffusion layer
20 . . . Fuel cell (unit cell)
  24A . . . First separator
  24B . . . Second separator
  25A, 25B . . . Seal member
  26A, 26B . . . Gas flow channel

The invention claimed is:

1. A fuel cell catalyst layer having a first principal surface extending in a principal surface direction and a second principal surface extending in the principal surface direction and located opposite to the first principal surface along a thickness direction of the fuel cell catalyst layer, the thickness direction being perpendicular to the principal surface direction, the fuel cell catalyst layer comprising:
a fibrous carbon material;
catalyst particles;
a particulate carbon material; and
a proton-conductive resin, wherein:
the fuel cell catalyst layer comprises a region A including at least the fibrous carbon material in a state of an agglomerated body and a region B including at least the catalyst particles, the particulate carbon material, and the proton-conductive resin,
the region A is disposed in an island shape surrounded by the region B in the fuel cell catalyst layer,
a porosity of the region A is higher than a porosity of the region B,
a length Ls of the region A in the principal surface direction of the fuel cell catalyst layer and a length Lt of the region A in the thickness direction satisfy the relationship: Ls<Lt, and
the region A touches the both the first principal surface and the second principal surface.

2. The fuel cell catalyst layer according to claim 1, wherein the region A has a major diameter Lm of 1 to 50 μm.

3. The fuel cell catalyst layer according to claim 1, wherein the catalyst particles are supported on the particulate carbon material and the fibrous carbon material.

4. The fuel cell catalyst layer according to claim 1, wherein a volume Va of the region A and a volume V of the fuel cell catalyst layer satisfy the relationship: 5%≤Va/V≤60%.

5. A fuel cell comprising:
an electrolyte membrane;
a first catalyst layer and a second catalyst layer that are disposed so as to sandwich the electrolyte membrane;
a first gas diffusion layer and a second gas diffusion layer that are disposed so as to sandwich the electrolyte membrane via the first catalyst layer and the second catalyst layer respectively; and
a first separator and a second separator that are disposed so as to sandwich the electrolyte membrane via the first gas diffusion layer and the second gas diffusion layer respectively,
wherein at least one of the first catalyst layer and the second catalyst layer is the fuel cell catalyst layer according to claim 1.

6. A fuel cell catalyst layer having a first principal surface extending in a principal surface direction and a second principal surface extending in the principal surface direction and located opposite to the first principal surface along a thickness direction of the fuel cell catalyst layer, the thickness direction being perpendicular to the principal surface direction, the fuel cell catalyst layer comprising:
a fibrous carbon material;
catalyst particles;
a particulate carbon material; and
a proton-conductive resin, wherein:
the fuel cell catalyst layer comprises a plurality of regions A including at least the fibrous carbon material in a state of an agglomerated body and a region B including at least the catalyst particles, the particulate carbon material, and the proton-conductive resin,
each of the plurality of regions A is surrounded by the region B in the fuel cell catalyst layer,
a porosity of the plurality of regions A is higher than a porosity of the region B, and
at least one of the plurality of regions A touches the both the first principal surface and the second principal surface.

* * * * *